United States Patent
Meroux et al.

(10) Patent No.: US 11,658,830 B2
(45) Date of Patent: May 23, 2023

(54) SYSTEMS AND METHOD FOR RIDESHARING USING BLOCKCHAIN

(71) Applicant: Ford Global Technologies, LLC, Dearborn, MI (US)

(72) Inventors: Dominique Meroux, Fair Oaks, CA (US); Zhen Jiang, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/561,729

(22) Filed: Sep. 5, 2019

(65) Prior Publication Data

US 2021/0072034 A1   Mar. 11, 2021

(51) Int. Cl.
| | |
|---|---|
| H04L 9/06 | (2006.01) |
| G06F 21/55 | (2013.01) |
| H04L 9/32 | (2006.01) |
| G06F 21/64 | (2013.01) |
| H04L 9/00 | (2022.01) |
| G01C 21/34 | (2006.01) |
| G01C 21/36 | (2006.01) |
| G05D 1/00 | (2006.01) |

(52) U.S. Cl.
CPC ..... *G01C 21/3438* (2013.01); *G01C 21/3446* (2013.01); *G01C 21/3605* (2013.01); *G05D 1/0088* (2013.01); *G06F 21/554* (2013.01); *G06F 21/64* (2013.01); *H04L 9/0643* (2013.01); *H04L 9/3239* (2013.01); *H04L 9/3297* (2013.01); *H04L 9/50* (2022.05)

(58) Field of Classification Search
CPC .......... G01C 21/3438; G01C 21/3605; G01C 21/3446; G05D 1/0088; H04L 9/0643; H04L 2209/38; H04L 9/3297; H04L 9/3239; G06F 21/554
See application file for complete search history.

(56) References Cited

U.S. PATENT DOCUMENTS

| 10,521,780 B1* | 12/2019 | Hopkins, III | G06Q 20/10 |
|---|---|---|---|
| 2013/0054139 A1* | 2/2013 | Bodin | G01C 21/3438 |
| | | | 701/468 |
| 2017/0180964 A1* | 6/2017 | Mehta | H04W 64/00 |
| 2017/0364900 A1* | 12/2017 | Hudson | G06Q 20/3224 |
| 2018/0108089 A1* | 4/2018 | Jayachandran | G06Q 30/0282 |
| 2018/0126950 A1* | 5/2018 | Aiderman | H04W 4/40 |

(Continued)

OTHER PUBLICATIONS

Breitinger, Corinna. "Securing Video Integrity using decentralized trusted Timestamping on the Bitcoin Blockchain". AIS Electronic Library. MCIS 2016 Proceedings. 2016. (Year: 2016).*

*Primary Examiner* — Jeffrey C Boomer
(74) *Attorney, Agent, or Firm* — Brandon Hicks; Eversheds Sutherland (US) LLP

(57) ABSTRACT

Systems, methods, and computer-readable media are disclosed describing ridesharing using blockchain. Example methods may include determining a state associated with a user of a ridesharing vehicle from at least one first device associated with the ridesharing vehicle; identifying a confirmation of the state by one or more second devices; and adding a transaction to a blockchain, the transaction comprising a description of the state, the confirmation, and a link to a trip footage of the state.

20 Claims, 4 Drawing Sheets

(56) References Cited

U.S. PATENT DOCUMENTS

| | | | |
|---|---|---|---|
| 2018/0174122 A1* | 6/2018 | Mattingly | G06Q 20/223 |
| 2018/0338241 A1* | 11/2018 | Li | G08B 5/222 |
| 2018/0342036 A1* | 11/2018 | Zachary | H04L 9/0637 |
| 2019/0012249 A1* | 1/2019 | Mercuri | G06Q 20/308 |
| 2019/0098262 A1* | 3/2019 | Veneziano | H04N 5/33 |
| 2020/0108744 A1* | 4/2020 | Shiga | B60N 2/3009 |
| 2020/0159891 A1* | 5/2020 | Patel | H04L 9/3239 |
| 2020/0349345 A1* | 11/2020 | Hodge | G06Q 50/30 |
| 2020/0349666 A1* | 11/2020 | Hodge | G08G 1/0133 |
| 2020/0389760 A1* | 12/2020 | Ghannam | H04W 4/44 |
| 2021/0004929 A1* | 1/2021 | Sawahashi | G06Q 10/06316 |
| 2021/0029239 A1* | 1/2021 | Davis | H04W 4/90 |
| 2021/0072033 A1* | 3/2021 | Husain | H04W 4/024 |
| 2022/0021521 A1* | 1/2022 | Shamai | H04L 9/085 |

\* cited by examiner

SYSTEMS AND METHOD FOR RIDESHARING USING BLOCKCHAIN

TECHNICAL FIELD

The present disclosure relates to systems, methods, and computer-readable media for ridesharing, and in particular, for ridesharing using blockchain.

BACKGROUND

The increase in networking and electronic connectivity has led to increased commercial activity in conventional ridesharing and autonomous vehicle ridesharing applications. However, conventional mobile application-based ridesharing approaches may have some potential downsides. For example, as relates to information on the availability to rideshare, mobile application-based ridesharing approaches may be generally directed toward enabling trips for commuting. Accordingly, ridesharing may not be available at all times of the day and for longer and/or shorter distances than predetermined thresholds. Moreover, with conventional ridesharing systems, drivers may use dash cameras allowing drivers to livestream video of riders in an unauthorized manner. Accordingly, such conventional systems may not offer adequate control over when and where scenes are recorded on video and may be unable to control access to the video.

Conventional systems may further provide limited safety features such as fraud protection. For example, a driver may fraudulently claim that a rider of the ridesharing vehicle damaged the interior (e.g., by committing acts of vandalism or by vomiting). Additionally, conventional ridesharing systems may provide little or no protection from dangerous situations for passengers and/or drivers, such as assault, kidnapping, and other criminal actions. Further, conventional mobile application-based ridesharing approaches may not necessarily facilitate rider and driver experiences with the vehicle, including infotainment and dynamic social experiences. Conventional ridesharing implementations may lack the information, connectivity, safety, and social experience features made possible by technology integrated with the vehicle.

Therefore, what are needed are systems and methods for enhancing ridesharing systems and methods, for example, using blockchain technology.

DETAILED DESCRIPTION

Overview

Figure 1:
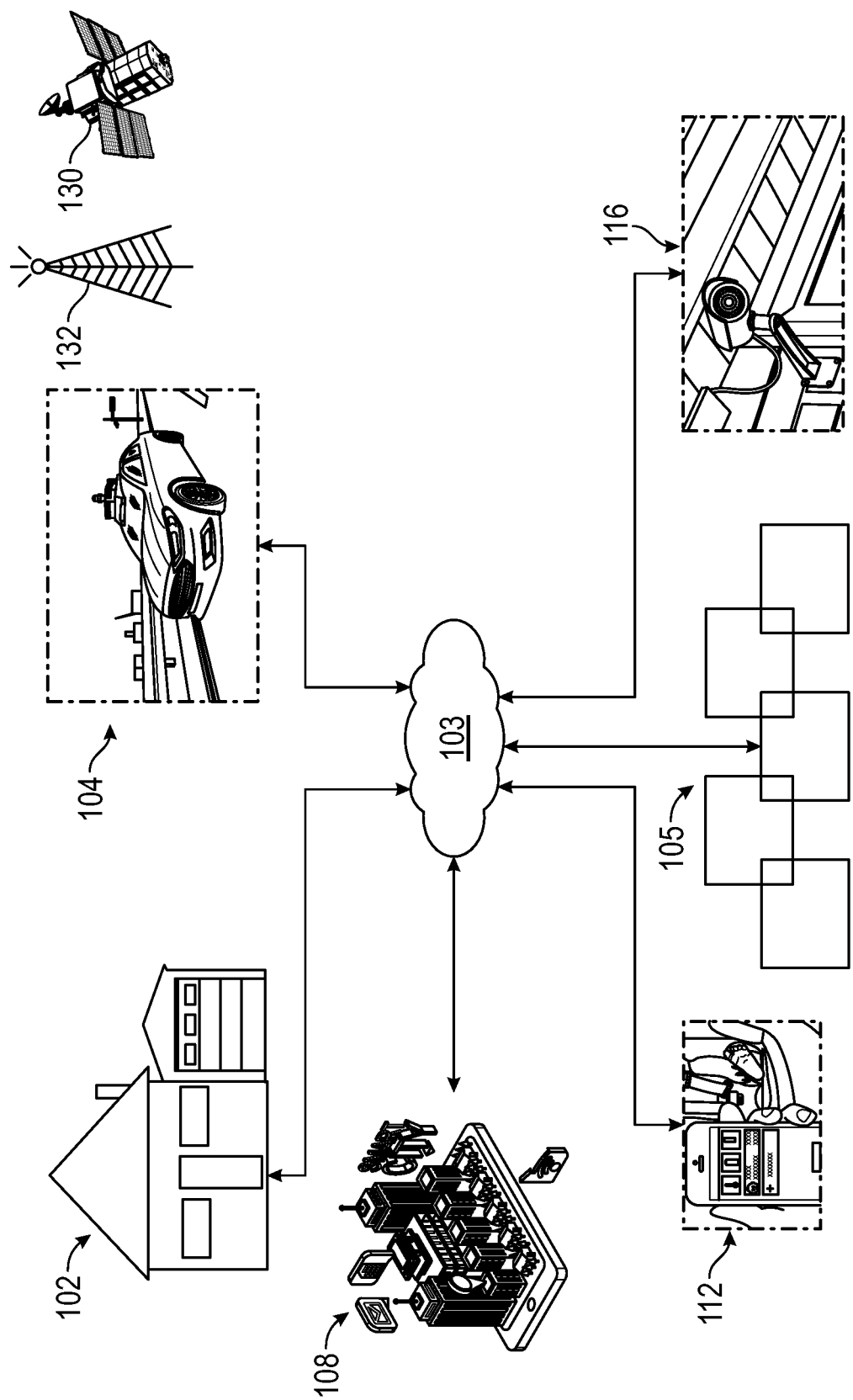
FIG. 1 shows an example usage scenario for ridesharing using blockchain, in accordance with example embodiments of the disclosure.

Artificial intelligence (AI) can include computer-implemented techniques and systems that seek to mimic human decision-making using data. Blockchain can represent a technology that can decentralize data control between nodes on a network, generate and examine immutable records on a public ledger, and exchange assets between the nodes. Blockchain can refer to a growing list of records, called blocks, that are linked to one another using cryptographic techniques. AI and blockchain can be used together to perform collaborative learning without using a centralized data store, to detect security concerns on the network of nodes, to improve hash-function privacy, and to predict a likelihood of a node fulfilling certain tasks. As detailed below, systems and methods are described whereby AI and blockchain are used to facilitate ridesharing applications with vehicles. In particular, the disclosure is generally directed to incorporating ridesharing functionality directly into a vehicle's systems using blockchain.

In some aspects, the integration of ridesharing functionality with a vehicle and with a vehicle's using blockchain may be contrasted with a mobile device-based ridesharing approach, where a vehicle and a vehicle's devices are not solicited for input and may not carry out various ridesharing tasks. Further, the disclosure describes the exchange of messages between user devices, vehicle devices, sensors, and environmental devices (e.g., infrastructural devices, third-party mobile devices, and the like) that can be recorded on the blockchain. Such message may include vehicle status information (e.g., textual descriptions that the vehicle is heading to a given rideshare pickup location, that an expected rider is entering the vehicle, that the vehicle is progressing toward a destination, and the like). Further, the vehicle status information may include vehicle location information, timestamp information associated with stops and notable events on a rideshare trip, a secure link to image, video, and/or audio footage of a given rideshare trip, and/or the like. In some examples, the disclosed systems can use messages that address multiple users of a ridesharing service. For example, the disclosed systems can use messages that include a textual description that a given ridesharing trip is in progress with a given first rider and that the vehicle is heading to pick up a second rider.

In some examples, the disclosed systems can include panic buttons that may be implemented into the vehicle system (e.g., in various locations in the cabin of the vehicle). A panic button can include an electronic device designed to assist in alerting somebody in emergency situations where a threat to persons or property exists. The activation of such panic buttons may send a packet of data to an entity, the data indicating an emergency status as well as a type of emergency (e.g., a medical emergency or an emergency requiring the police). In some cases, data related to emergency (e.g., time information, transcriptions of audio associated with passengers of the vehicle, audiovisual footage, etc.) can be written to the blockchain. In some examples, the disclosed systems can enable a passenger or a driver that feels threatened with the capability to provide a discrete emergency indication that can be relayed to emergency services. For example, such an emergency indication can include holding two fingers in a predetermined gesture in the field of view of a vehicle-based camera.

In some examples, messages can be transmitted between devices associated with other means of transportation (e.g., public transit, scooters, bicycles, etc.) that that can be in communication with the disclosed systems, and the messages can be recorded to the blockchain. In other aspects, the disclosed system may also implement techniques for establishing blockchain consensus. For example, the disclosed systems can determine that a threshold number of first devices (e.g., devices associated with users of the ridesharing application, vehicle devices, and infrastructural devices) report having the same hash values for the blockchain while a given second device (e.g., a driver's device) reports hash values that are not matching the expected hash values for the blockchain. Accordingly, the disclosed systems can transmit a message to the second device's owner (e.g., an email message, a text message to another device associated with the second device's owner, etc.) that a likely hacking event has occurred. In other examples, if multiple devices associated with the ridesharing blockchain report back with hash values that do not match the expected hash values of the blockchain, the disclosed systems may determine that a more severe security breach may have occurred. Accordingly, the disclosed systems can transmit an alert and/or an error message to all devices associated with the ridesharing blockchain. The disclosed systems may further specify a safety protocol (e.g., switch to a different application running in safe-mode, or use an Internet-based portal) to be followed and/or a message that must be resolved. Further, the disclosed systems can flag the vehicle and/or rideshare system's status values and determine that a backup protocol be used in processing those status values.

In some examples, the disclosed systems can be configured to selectively permit the recording and/or viewing of video footage (or other data). In particular, the recording and/or viewing of video footage may be based on legal rules (e.g., rules determined by government entities) and/or on user preferences. As one example, a recorded video footage may be viewable by law enforcement and associated entities (e.g., police, judges, lawyers, and/or juries) for a case (e.g., a case involving an altercation) where the events and/or fact patterns are disputed. Accordingly, the disclosed systems can generally preserve user privacy while also ensuring the safety of passengers and the legitimacy of various allegations (e.g., vomit fraud, assault, and the like).

Illustrative Embodiments

In some examples, drivers of ridesharing services can face a number of challenges. For example, drivers may face traffic congestion, may not be able to access high-occupancy vehicle (HOV) lanes, and may have to manage fuel costs. Moreover, vehicles used in ridesharing applications may have unused seating capacity. For example, single-occupant drivers may leave four to six seats empty during trips. While picking up additional passenger(s) may result in a route deviation, drivers may benefit from financial compensation and the ability to use HOV lanes. Further, social experiences in the context of transportation can result in increased user enjoyment of the trip. Additionally, the ratio of single-occupant to pooled rides can effect traffic congestion, air pollution, and accessibility and thereby influence environmental sustainability.

With all these potential issues, drivers may not participate in ridesharing even with the presence of HOV lanes. The global light-duty vehicle fleet is at 750 million vehicles in urban areas and 1.1 billion vehicles total, and the total fleet size may double by 2050. In some scenarios, ridesharing with personal vehicles may be facilitate environmental protection and reduce traffic-congestion. Even with an increase in the percentage of shared mobility services, personal vehicles may still have a relatively large presence in cities and non-urban areas. This presence may be due to the fact that these locations are often not optimized for dynamic shared ride services. Rideshare services today do not provide a solution due to their high cost (challenge to accessibility for low-income riders) and contribution to traffic congestion and air pollution with deadhead travel (driving without a passenger).

As noted, conventional systems may rely on drivers using mobile phones. This use of mobile phones can lead to safety and trust issues, privacy issues, neglect of the experience of the rider and the driver within the vehicle, and can cause limitations on the availability of information on supply and demand for rideshare rides. Accordingly, built-in integration of ridesharing functionality with a vehicle can re-shape user comfort with ridesharing and can remove some of the risky elements of the ridesharing experience. For example, the disclosed systems can enable integration with in-vehicle security-related hardware in combination with secure ledger systems like blockchain. This integration can offer a fault-tolerant means of addressing some of the noted concerns surrounding safety and security. Further, this integration can offer a fault-toleration means of addressing disputed fees while maintaining user privacy. For example, the disclosed systems can reduce the incidence of so-called vomit fraud whereby a driver falsely claims that a rider damaged the interior and bills for a respective fee. The disclosed system can use in-vehicle sensors to provide the driver or a fleet operator with information about the rideshare trip cost, such as fuel cost, mileage, revenue, and the like.

In some examples, the disclosed systems can improve user ridesharing experience through integration with the human-machine interface (HMI) of vehicles and in-vehicle infotainment (IVI) controls and screens, including navigation and entertainment functions. The disclosed systems can further use on-vehicle sensors to provide the driver or fleet operator with information regarding rideshare trip costs (e.g., fuel cost, mileage associated with each pickup, wear-and-tear) and rideshare trip costs relative to revenue. Further, disclosed systems can provide the driver or fleet operator with information regarding rideshare trip costs both before the trip (estimated values) and after (actual values).

In other examples, the disclosed systems can enable vehicle support of clean fuel and environmentally friendly powertrains while observing infrastructure or driving range limitations. In other examples, the disclosed systems can facilitate mass adoption of rideshare matching along trips such as work commute trips, road trips, or errand trips. In particular, the disclosed systems can facilitate the use of HOV lanes and a reduction in vehicle miles traveled (VMT). The disclosed systems can support benefits from transportation demand management funding, with a reduction in fraudulent use. For example, the disclosed systems can facilitate drivers obtaining a free pass from toll roads when the driver has been verified through a real-time blockchain ledger to be currently driving rideshare occupants.

FIG. 1 shows an example usage scenario for increasing vehicle safety for passengers using blockchain, in accordance with example embodiments of the disclosure. In particular, house 102 may include various sensors and/or cameras that may detect individuals and animals entering and exiting the house and going to and from a vehicle. The disclosed systems may receive messages over a network 103 from devices associated with the house 102 that can report transactions describing such interactions between the individuals, the house, and/or the vehicle. Further, the devices associated with the house 102 can send confirmation messages over a network 103 that may confirm other transactions generated by additional devices (to be shown and described further below). These confirmation messages may also be written to the blockchain 105 in order to provide a record of transactions in confirmations.

Vehicle 104 may include various devices (e.g., surveillance systems, cameras, wireless transceivers, vehicle doors and seats with embedded sensors, and/or the like) that may detect individuals entering and exiting the vehicle and going to and from the vehicle towards a given destination (e.g., A house 102, work, a store, and/or the like). The disclosed systems may receive messages over a network 103 from devices associated with the vehicle 104 that can report transactions describing such interactions between the individuals and the vehicle. Further, the devices associated with the vehicle 104 can send confirmation messages that may confirm other transactions generated by additional devices. These confirmation messages may also be written to the blockchain 105 in order to provide a record of transactions in confirmations. For example, the vehicle 104 may confirm a transaction generated by a surveillance system of the house 102 indicating that a ridesharing user is traveling towards and/or entering the vehicle 104.

The vehicle 104 can include sensors that may determine when a ridesharing passenger enters or leaves the vehicle. The vehicle 104 can therefore generate transactions describing the interaction between the passenger and the vehicle. Further, the vehicle's sensors can send confirmation messages over a network 103 that may confirm other transactions generated by additional devices. These confirmation messages may also be written to the blockchain 105 in order to provide a record of transactions in confirmations. For example, the vehicle's sensor may confirm a transaction generated by a vehicle 104 indicating that the passenger is entering the vehicle 104 after the passenger is seated in the vehicle.

User device 112 may be used by individuals (e.g., passengers of vehicles, bystanders, etc.) to send confirmation messages over a network 103 that may confirm other transactions generated by additional devices. These confirmation messages may also be written to the blockchain 105 in order to provide a record of transactions in confirmations. For example, the individual may use a user device 112 to confirm a transaction generated by a vehicle 104 indicating that the rideshare passenger is entering the vehicle 104.

The locations at which the rideshare passengers are transported to may include various devices such as surveillance systems (e.g., similar to surveillance system 116) that may monitor the interactions of individuals including drivers and passengers. In particular, infrastructural elements 108 and associated devices at some locations may be configured to transmit transactions over the network 103 indicative of passengers entering a location or exiting a location, passing in a given neighborhood, etc. In other examples, infrastructural elements 108 and associated devices at a given location may transmit periodic transactions over the network 103 indicative of a passengers, drivers, and ridesharing vehicles (e.g., vehicle 104) spending time at the given location. Further, the infrastructural elements 108 and associated devices of the location can send confirmation messages over a network 103 that may confirm other transactions generated by additional devices. These confirmation messages may also be written to the blockchain 105 in order to provide a record of transaction confirmations. For example, infrastructural elements 108 and associated devices at a given location may confirm a transaction generated by a vehicle 104 indicating that the passenger is travelling towards a given destination.

Surveillance system 116 may be used in connection with any location and/or infrastructural elements 108, a vehicle 104, a house 102, and/or the like. In particular, the surveillance system 116 may monitor the activity of individuals at a given location, within vehicle, traveling to and from a vehicle, entering or exiting a house, and/or the like. The surveillance system 116 may also transmit transactions over the network 103 that can be written to blockchain 105. Additionally, surveillance system 116 may confirm transactions that were previously written by other devices to the blockchain 105. For example, the surveillance system of 116 associated with the house 102 can confirm a transaction indicating that the passenger has exited the house and is traveling towards and/or entering the vehicle 104.

In various aspects, the disclosed systems can implement alternative options, backup protocols, and/or additional security layers to complement a blockchain approach to message confirmation. For example, the disclosed systems can use devices having location and speed sensors that can be paired with the vehicle 104. The disclosed systems can configure the devices to perform confirmation and validation to determine and verify each segment of the trip. In other examples, the disclosed systems can configure vehicle 104 devices to encrypt video and/or audio footage along with other information. The disclosed systems can configure vehicle 104 devices to send the encrypted footage and/or information to a server (not shown) over network 103. Further, the disclosed systems can configure the server such that only authorized parties can have access to the information. In some examples, the driver and/or passengers may be excluded from accessing the information. In the event that the disclosed systems detect hacking or a security breach outside of a rideshare trip, an investigation protocol may need to be followed. If a security breach is detected during a rideshare trip, the corresponding rideshare features may be shut down and a manual protocol may be followed. As an example, law enforcement may be contracted to manually verify certain steps to ensure a safe trip and the vehicle 104 may be rendered temporarily unconnected to external networks (e.g., the Internet).

The disclosed systems can verify that a trip is in progress by synchronizing with connected infrastructural elements 108. In some cases, the disclosed systems can use the infrastructural elements 108 to enable disbursement of incentives to the driver and/or vehicle 104. In some aspects, the disclosed systems can generate financial incentives, for example, the inclusion of a subsidized rideshare rate. In some examples, the subsidized rates may be applied in regions where public and/or employer transportation demand management (TDM) programs offer such subsidies as a means of mitigating traffic congestion and reducing the need for parking infrastructure. In other examples, the disclosed systems can generate sustainability-related credits, for example, in any form of blockchain-enabled rewards for ridesharing including low-carbon transportation vehicles. In some aspects, the disclosed systems can generate incentives that reduce the amount of time that a ridesharing vehicle 104 spends in traffic, for example, by allowing the vehicle 104 to use an HOV lane, bypass toll booths, and the like. In some examples, the disclosed systems can use vehicle's 104 telemetry data to calculate a fair compensation amount from the rider to the driver. Further, the disclosed systems can use the telemetry data to ensure that this amount does not drop below a fair value for distance-based depreciation, maintenance costs, fuel costs, and time costs.

In some examples, the disclosed systems can include additional rideshare package features for a vehicle owner and/or a fleet operator to indicate that he or she can make a given trip (or is currently on a trip) of any suitable trip type (e.g., work commutes, road trips, and the like). The rideshare package features can allow the driver to specify the origin and destination of the trips and can allow the drivers to indicate that they are willing to pick up rider(s) along a route between the origin and destination.

During a ridesharing mode of operation, the disclosed systems can configure a vehicle's 104 driver assist program to include a feature to remind the driver when they are traveling a threshold amount above a speed limit. In other examples, the disclosed systems may include a speed limiter to mitigate concern about reckless driving claims by the rideshare rider. In addition, the disclosed system's rideshare package can be integrated with other relevant driver assist technologies.

In some examples, the disclosed systems can be configured to provide information regarding the vehicle's 104 battery electric range and/or a range and power stations for other alternative fuels (e.g., hydrogen stations). Further, the disclosed systems can inform the driver and prospective passengers of the vehicle 104 of any stops that may be needed along a route for charging the vehicle 104. The disclosed systems can also provide recommendations for charging locations. In some examples, the disclosed systems can integrate rideshare functionality into any driver and passenger in-vehicle infotainment (IVI) and/or human-machine interface (HMI) for improved user experience.

In some examples, the vehicle 104 may be any suitable vehicle such as a vehicle, truck, recreational vehicle (RV), boat, plane, etc., and may be equipped with suitable hardware and software that enables the vehicle 104 to communicate over a network, such as a local area network (LAN).

In another embodiment, the vehicle 104 may include a variety of sensors that may aid the vehicle in determining its location, which may be helpful for navigation and to determine the context in which the passengers and/or vehicle may be (e.g., in a store parking lot, at home, etc.). The sensors may include radio detection and ranging (RADAR), light detection and ranging (LIDAR), cameras, magnetometers, ultrasound, barometers, and the like. In one embodiment, the sensors and other devices of the vehicle 104 may communicate over a network connection, In other embodiments, the vehicle 104 and/or a delivery vehicle may communicate with the user at a user device using the network connection. Examples of suitable network connections include a controller area network (CAN), a media-oriented system transfer (MOST), a local interconnection network (LIN), a cellular network, a Wi-Fi network, and other appropriate connections such as those that conform with known standards and specifications (for example, one or more Institute of Electrical and Electronics Engineers (IEEE) standards, and the like).

In another aspect, diagram 100 shows satellite 130 and one or more cellular towers 132. In another embodiment, the vehicle 104 may include a transceiver, which may in turn may include one or more location receivers (for example, GPS receivers) that may receive location signals (for example, GPS signals) from one or more satellites 130. In another embodiment, a GPS receiver may refer to a device that can receive information from GPS satellites (for example, satellites 130) and calculate the vehicle's 104 geographical position. The disclosed systems can use the locations to track the vehicle 104, provide navigation information, store location and timestamp information on the blockchain, and the like.

As noted, the nodes (e.g., the vehicle 104, devices of the house 102, the surveillance system 116, etc.) may be configured to communicate over a network 103, wirelessly or wired. The network 216 may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Further, the nodes (e.g., the vehicle 104, devices of the house 102, the surveillance system 116, etc.) may include any suitable radio and/or transceiver for transmitting and/or receiving radio frequency (RF) signals in the bandwidth and/or channels corresponding to the communications protocols utilized by any of the user device and/or the vehicle devices to communicate with each other. The radio components may include hardware and/or software to modulate and/or demodulate communications signals according to pre-established transmission protocols.

Although the examples described herein primarily focus on ridesharing and passenger transport applications, the disclosed systems, methods, and apparatus may also be applicable to package delivery.

Figure 2:
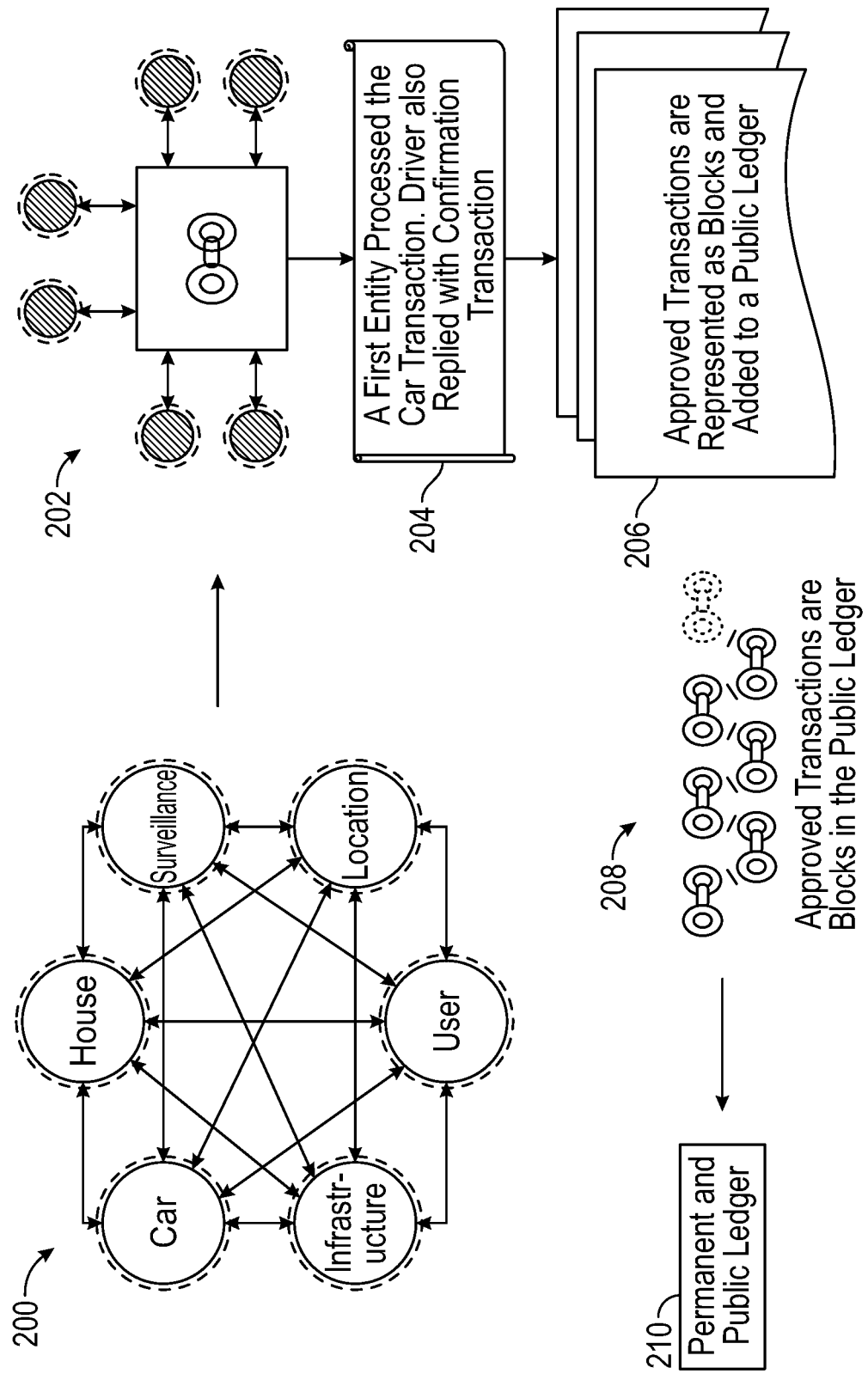
FIG. 2 shows a diagram representing how blockchain can be used to record ridesharing-related transactions via devices on a network, in accordance with example embodiments of the disclosure.

FIG. 2 shows a diagram representing how blockchain can be used to record rideshare-related transactions via devices on a network, in accordance with example embodiments of the disclosure. Diagram 200 shows a representation of a network of nodes that can monitor the status of an individual (e.g., a passenger or driver) during their various interactions with a vehicle, a house, a location of interest, surveillance systems, infrastructural elements, and other users. In particular diagram 200 shows various elements some of which are similar to the elements shown and described in connection with FIG. 1, above. The nodes can communicate with one another over a network (e.g., a peer-to-peer network) and can generate transactions in confirmations of the transactions, which can be written to a blockchain.

In some examples, diagram 202 shows a transaction that can be funneled into a network and broadcasted to devices associated with each node. For example, a surveillance system can generate a transaction which may be indicative of a passenger entering a vehicle. This transaction may be broadcast to devices associated a driver of the vehicle, a device of a house, devices at a location of business, etc. Further, more nodes that are in proximity to the surveillance system may generate confirmation messages for the transactions that confirm the passenger entering the vehicle. For example, a driver of the vehicle or other passengers in a carpool application can generate a confirmation message that confirm that the passenger is entering the vehicle via their mobile devices. These confirmation messages can also be written to the blockchain.

As noted, a vehicle (e.g., vehicle 104 shown and described in connection with FIG. 1, above) can include a ridesharing system integrated with the vehicle. For example, the ridesharing system can be provided by an original equipment manufacturer (OEM). Further, the ridesharing system can be configured to exchange and record messages associated with the shared rides with blockchain as described above. In some examples, the messages can include a vehicle status information, a vehicle location, a timestamp, and a secure link to audio and/or video footage of the external or internal environment of the vehicle during a ridesharing trip. In some examples, the footage may be made selectively accessible to law enforcement. In other examples, the footage may be shown only after at least one occupant in the vehicle (at time of incident) legally consents.

In some examples, a vehicle's modem may securely upload images, videos and telemetry data, and regularly update the vehicle's status in connection with a user application. Further, the disclosed systems can write the messages to the blockchain at changes in the vehicle's status. The disclosed systems can generate a status message that reflects that a user is heading to a rideshare pickup location once a rideshare match has been identified (e.g., by a cloud-based platform), accepted by the driver, and the vehicle is heading to the pickup location. In some examples, if a rideshare match occurs before the start of a trip (e.g., a day before a trip), the disclosed systems can transmit the message to the blockchain at the start of the trip, when the user is heading to the rideshare pickup.

After the vehicle picks up a passenger, the disclosed systems can switch the vehicle to a rideshare mode of operation. The rideshare mode can include operation to securely log footage (e.g., video and audio footage) and generate status update messages for recording to the blockchain. In some aspects, the disclosed systems can determine the status of a rider, for example, by determining that the rider enters into the vehicle when a door of the vehicle opens. In other examples, the disclosed systems can configure the vehicle to recognize the rider via biometrics (e.g., facial recognition, fingerprints and/or retina scanning) prior to unlocking the door.

The disclosed systems can ascertain the status of trip in progress, for example, by determining that a passenger's seat belt has been buckled. In some examples, the status and corresponding message associated with the status may reflect the passenger count. For example, the disclosed systems can generate a status and corresponding message indicating that a trip is in progress with a given rider A (one person), or that a trip is in progress with a group A (multiple people requested by rider A).

The disclosed systems can scale up the determination of passenger statuses and corresponding messages to multi-rider and multi-group scenarios. For example, the disclosed systems can record riders entering and exiting the vehicle at different times. In some examples, the disclosed systems can match additional rider(s) or groups during a trip. The number of additional rider(s) or groups may be as large as the number of available seats and given a threshold of allowable expected route deviation times for the driver and rider(s). The disclosed systems can further determine and generate messages to reflect the status of passengers to reflect the current number of occupant(s) already on board, as well as the status related to additional rider(s). For example, the disclosed systems can generate messages to indicate that a trip is in progress with a given first rider, and that the vehicle is heading to a rideshare pickup location for a second rider.

In some examples, the disclosed systems can determine and generate messages indicating that the status of the trip as a rideshare trip has ended for each rider after that rider has left the vehicle. For example, the disclosed systems can detect that the rider is exiting the vehicle via a camera or via any suitable sensor recognition system along with a computer vision algorithm. The disclosed systems can detect that the rider is exiting the vehicle at least because the disclosed systems can recognize, through a controller area network (CAN), that a passenger's seat belt has been unbuckled and that the rider has closed the door.

In some examples, the disclosed systems may handle certain special cases related to ridesharing. For example, the disclosed systems can determine a change in the real-time pickup or drop-off location from the designated pickup or drop-off location. Accordingly, the disclosed systems can trigger a safety mechanism to request support by law enforcement. For safety and emergency situations, the disclosed systems can include panic buttons. The safety mechanism and/or the panic buttons can send a packet of data through the blockchain ledger indicating the status as an emergency and the type as either a medical emergency or a police emergency. In other examples, the disclosed systems can configure a physical and/or a digital panic button in the vehicle (for example on displays of an infotainment system, and/or on the mobile application) that can be used in cases where medical support or police support may be needed. For example, the physical and/or a digital panic button can be used during when a rideshare user is having a medical emergency and the driver may need to quickly contact emergency services such as an ambulance.

In some examples, in the event of a dispute where either a rider or the driver feels threatened and wants intervention by authorities, the disclosed systems can provide a discrete way for a passenger or rider to seek help. In some aspects, before the rider boards the vehicle, the disclosed systems can communicate examples of one of many possible signaling gestures to the rider(s) and the driver to indicate a potentially dangerous situation. For example, the disclosed systems can include signaling gesture that include holding two fingers in some manner in view of a camera (but not in view of the driver). The disclosed systems may accept a variety of possible gestures and combinations of gestures. In some examples, the gestures may be simple to carry out, discrete, and not easily or accidentally signaled (e.g., the gestures may not include commonly used gestures).

The disclosed systems can share information and messages to be recorded on the blockchain to be shared with at least a threshold number of entities and particular types of entities in order to support consensus. In some examples, the disclosed systems may configure the entities to validate vehicle information, and may receive a copy of the blockchain and the blockchain information and/or messages to be added to the blockchain. Further, the disclosed systems can configure the entities to perform a verification step to ensure that the hash values associated with the information and/or entities adding the messages and/or information match when queried. Example entities can include the mobile devices of rider(s) on board the vehicle as well as well as mobile devices of upcoming riders, various devices associated with the vehicle itself (e.g., surveillance systems, sensors, infotainment systems, and the like). In some examples, it may desirable for the vehicle to validate that a ridesharing service has been provided as expected, for example, in cases where ridesharing is subsidized. In order to validate the ridesharing service, the rideshare rider's mobile device sensors may need to have agreement with the vehicle's sensors (e.g., a GPS location and/or speed of the vehicle within some acceptable error bound). In some examples, the other entities can include connected vehicles participating on a ridesharing platform or on separate platforms (e.g., scooters, bicycles, rideshares, micro transit, public transit, or privately-owned vehicles) with an established communications protocol.

The disclosed systems can incorporate data generated by transportation modes a rider may have used prior to or after the rideshare on a multi-modal journey. For example, if a rider takes a rideshare trip to a micro transit shuttle, other passengers boarding (or exiting) the shuttle may confirm the transfer between rideshare and shuttle. For example, the disclosed systems can configure the devices of the other passengers on the shuttle to automatically generate messages confirming the transfer via a shared ridesharing application. In some aspects, the disclosed systems can provide a copy of the blockchain to the micro transit service to verify matching hash values and to confirm that no tampering has occurred.

In some examples, the disclosed systems can use entities such as road network infrastructure or refueling infrastructure on a route for a given rideshare using an established communications protocol. For example, the disclosed systems can use a vehicle passing an intersection to identify timestamp information, GPS information, speed information, and vehicle meta-identification information (e.g., license plate information). Further, the disclosed systems can determine that such information are within an acceptable error bound and can use the information to establish consensus for the blockchains.

In some aspects, the disclosed systems can have error handling protocols to take action when there is a lack of consensus between entities confirming information to be written to the blockchain. For example, if a threshold number of entities associated with the blockchain report the same hash values and a given entity reports different hash values, the disclosed systems can generate a message to the device owner (e.g., an infrastructural element, a mobile phone, a vehicle, etc.) that a hacking event may have occurred. If multiple entities associated with the blockchain report hash values that do not match the expected hash value, the disclosed systems may determine that a more severe issue occurred. Accordingly, the disclosed systems can generate an error message that is reported to the devices associated with the blockchain. The error message may indicate actions that may need to be taken to resolve the issue. Further, the disclosed systems can flag the ridesharing system's status messages for further verification, and may indicate that backup protocols may need to be used until the error is resolved.

In some cases, a fewer number of and/or lower diversity type of entities may report confirmations to transactions on the blockchain than may be needed to form consensus. Although the disclosed systems can be configured to allow consensus with only two actors, the disclosed systems may be configured to implement greater security by having a threshold number of devices. In some example, if a threshold (count) is not met, a backup protocol must be used. In some examples, if a large percentage of the entities and/or devices providing verification for messages on the blockchain are on the same network or server, the risk of hacking may be increased. Accordingly, the disclosed systems can specify a diversity threshold. For example, the disclosed systems a diversity threshold by specifying that a minimum number of separate sources (for example, at least one of smart infrastructure, rider mobile device, and additional roadway vehicle) may need to provide the confirmation.

At stage 204, a driver can process a vehicles transaction. Further the driver can also reply with the confirmation transaction that the drivers in the vehicle. This transaction can be transmitted to all other nodes on the network to confirm and validate the transaction.

At stage 206, approved transactions (e.g., transactions that have been confirmed by other nodes in the network) can be represented as blocks and added to the blockchain which represents a public ledger. For example, such approved transactions may include a transaction generated by the vehicle that the passenger is in the vehicle and/or a transaction generated by the device of the driver, the transaction indicative of the driver being in the vehicle with the passenger.

As noted, at stage 208, the confirmed and approved transactions can represent additional blocks that are added to the blockchain serving as a public ledger. At stage 210, these additional blocks can become part of the permanent public ledger.

Figure 3:
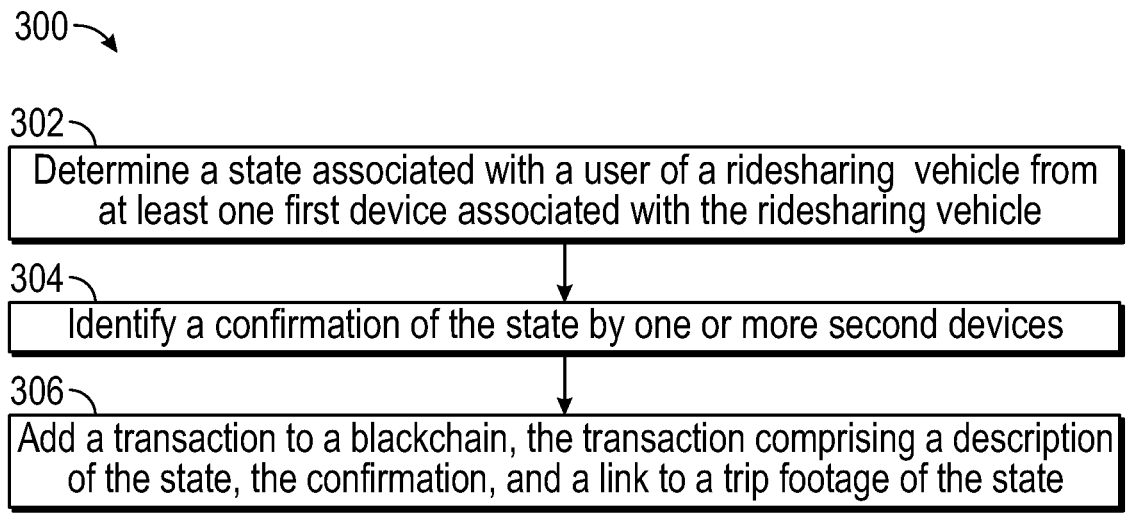
FIG. 3 show example process flows describing a method for ridesharing using blockchain, in accordance with example embodiments of the disclosure.

FIG. 3 show example process flows describing a method for ridesharing using blockchain, in accordance with example embodiments of the disclosure. At block 302, the method can include determining a state associated with a user of a ridesharing vehicle from at least one first device associated with the ridesharing vehicle. In some examples, the state can include a safety state of the user, and the method can further include receiving an indication, via a panic button, that the safety state of the user comprises an emergency condition. Accordingly, the disclosed systems can notify an entity about an occurrence of the emergency condition. In other examples, the disclosed systems can determine that the state is indicative of an emergency condition associated with the user or the ridesharing vehicle, and notify an entity about an occurrence of the emergency condition.

At block 304, the method can include identifying a confirmation of the state by one or more second devices. In some examples, the second devices comprise an infrastructural element device, another user's device, or another vehicle's device in proximity to the ridesharing vehicle.

At block 306, the method can include adding a transaction to a blockchain, the transaction comprising a description of the state, the confirmation, and a link to a trip footage of the state. In some examples, the transaction can further include a ridesharing status information comprising at least one of: an indication that the ridesharing vehicle is travelling to a destination, an indication that the ridesharing vehicle is picking up the user from a pickup location, or an indication that the ridesharing vehicle is dropping off the user at a drop-off location.

In other examples, the transaction can further include a ridesharing vehicle's location and a timestamp of the ridesharing vehicle at the location. Further, the method can further include identifying that a threshold number of second devices generate respective hash values associated with the blockchain, determine that the respective hash values do not match a predetermined hash value, and transmit a message to the second devices indicative of an occurrence of a hacking event associated with the blockchain.

Further, as noted, the devices and systems (and their various components) described herein can employ AI to facilitate the multimodal delivery and other features described herein. The components can employ various AI-based schemes for carrying out various embodiments and/or examples disclosed herein. To provide for or aid in the numerous determinations (for example, determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data. For example, the AI can be used to determine the possibility and/or preferability of making a delivery of an item to a particular location.

Such determinations can result in the construction of new events or actions from a set of observed events and/or stored event data, whether the events are correlated in close temporal proximity, and whether the events and data come from one or several event and data sources (for example, different sensor inputs). Components disclosed herein can employ various classification (explicitly trained (for example, via training data) as well as implicitly trained (for example, via observing behavior, preferences, historical information, receiving extrinsic information, etc.)) schemes and/or systems (for example, support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations. In some examples, the training may involve using data associated with previously successful and unsuccessful deliveries of an item to a location to train the AI-based techniques in order to improve the likelihood of successful item delivery by the delivery vehicles and/or the AVs, A classifier can map an input attribute vector, $z=(z1, z2, z3, z4, \ldots, zn)$, to a confidence that the input belongs to a class, as by $f(z)=\text{confidence}(\text{class})$. Such classification can employ a probabilistic and/or statistical-based analysis (for example, factoring into the analysis utilities and costs) to determinate an action to be automatically performed. In some examples, the disclosed systems may use a classifier to classify an item delivery by a delivery vehicle as being possible or not-easily possible, and/or to classify the item delivery by the delivery vehicle as being preferable or not preferable. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 4:
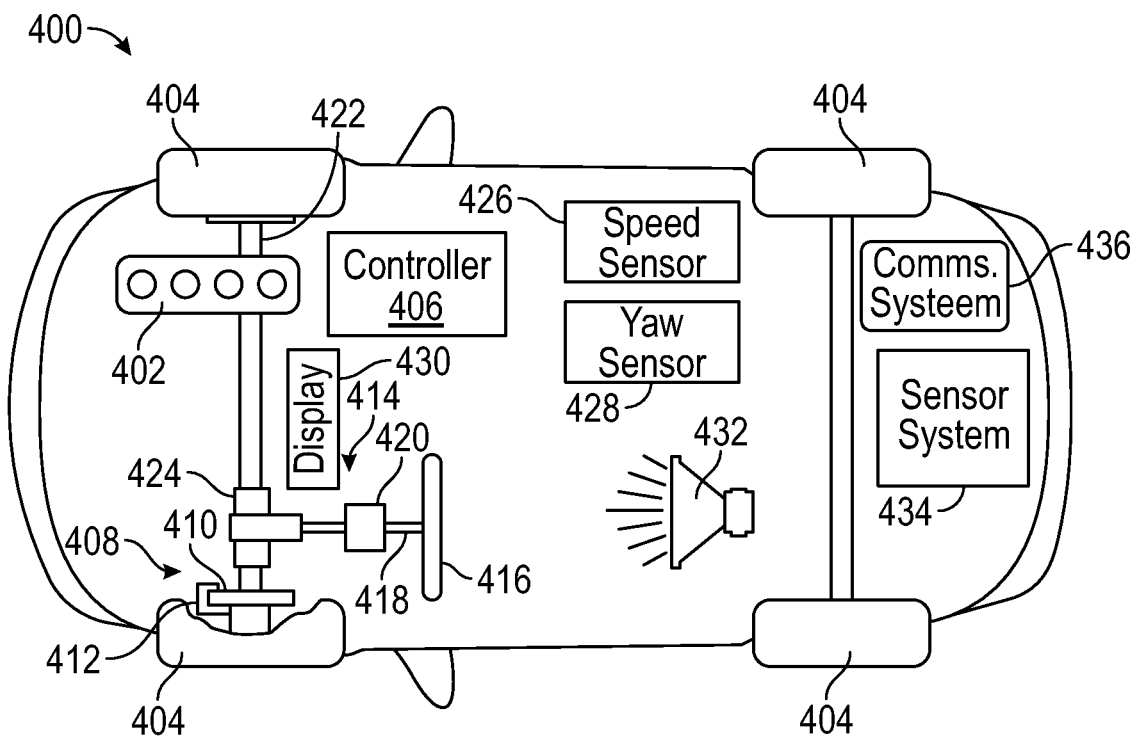
FIG. 4 is a schematic illustration of an example autonomous vehicle (AV) that can provide ridesharing services using blockchain using the disclosed systems and methods, in accordance with one or more embodiments of the disclosure.

FIG. 4 is a schematic illustration of an example autonomous vehicle in accordance with one or more embodiments of the disclosure. In particular, the vehicle (for example, vehicle 104 shown and described in connection with FIG. 1, above), may include an AV. Referring to FIG. 4, an example AV 400 may include a power plant 402 (such as a combustion engine and/or an electric motor) that provides torque to driven wheels 404 that propel the vehicle forward or backward.

Autonomous vehicle operation, including propulsion, steering, braking, navigation, and the like, may be controlled autonomously by a vehicle controller 406. For example, the vehicle controller 406 may be configured to receive feedback from one or more sensors (for example, sensor system 434, etc.) and other vehicle components to determine road conditions, vehicle positioning, and so forth. The vehicle controller 406 may also ingest data form various sensors such as speed monitor and yaw sensor, as well as the tires, brakes, motor, and other vehicle components. The vehicle controller 406 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 406 may be configured to interact with the user by communicating with the user's user device.

The vehicle controller 406 may include one or more computer processors coupled to at least one memory. The vehicle 400 may include a braking system 408 having disks 410 and calipers 412. The vehicle 400 may include a steering system 414. The steering system 414 may include a steering wheel 416, a steering shaft 418 interconnecting the steering wheel to a steering rack 420 (or steering box). The front and/or rear wheels 404 may be connected to the steering rack 420 via axle 422. A steering sensor 424 may be disposed proximate the steering shaft 418 to measure a steering angle. The vehicle 400 also includes a speed sensor 426 that may be disposed at the wheels 404 or in the transmission. The speed sensor 426 is configured to output a signal to the controller 406 indicating the speed of the vehicle. A yaw sensor 428 is in communication with the controller 406 and is configured to output a signal indicating the yaw of the vehicle 400.

The vehicle 400 includes a cabin having a display 430 in electronic communication with the controller 406. The display 430 may be a touchscreen that displays information to the passengers of the vehicle and/or functions as an input. A person having ordinary skill in the art will appreciate that many different display and input devices are available and that the present disclosure is not limited to any particular display. An audio system 432 may be disposed within the cabin and may include one or more speakers for providing information to users that pickup items. The audio system 432 may also include a microphone for receiving voice inputs or detecting sounds at the residence (for example, animal sounds). The vehicle may include a communications system 436 that is configured to send and/or receive wireless communications via one or more networks. The communications system 436 may be configured for communication with devices in the vehicle or outside the vehicle, such as a user's device, the delivery vehicles, etc.

The vehicle 400 may also include a sensor system for sensing areas external to the vehicle, such as user residences, animals, users, driveways, and the like (shown and described in connection with FIG. 1, above). The sensor system may include a plurality of different types of sensors and devices such as cameras, ultrasonic sensors, RADAR, LIDAR, microphones, and/or combinations thereof. The sensor system may be in electronic communication with the controller 406 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 406 may receive signals from the sensor system 434 and may include memory containing machine-readable instructions for processing the data from the sensor system. The controller 406 may be programmed to output instructions to at least the display 430, the audio system 432, the steering system 414, the braking system 408, and/or the power plant 402 to autonomously operate the vehicle 400.

Figure 5:
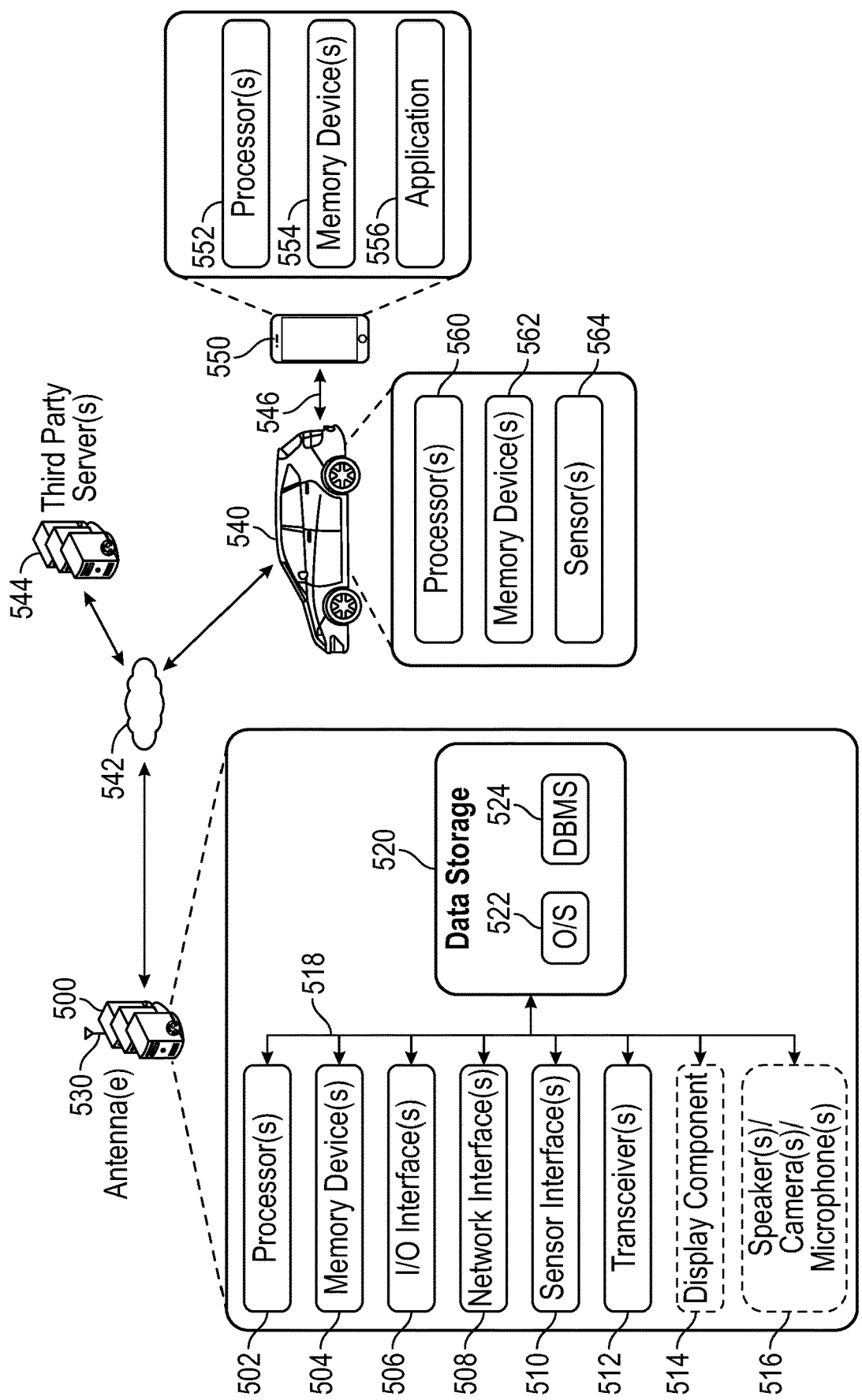
FIG. 5 is a schematic illustration of an example server architecture for one or more servers that can be used for providing ridesharing services using blockchain, in accordance with one or more embodiments of the disclosure.

FIG. 5 is a schematic illustration of an example server architecture for one or more server(s) 500 in accordance with one or more embodiments of the disclosure. The server 500 illustrated in the example of FIG. 5 may correspond to a server that may be used by a vehicle (for example, vehicle 104 as shown and described in connection with FIG. 1, above), and/or on a network associated with any of the nodes of the network. In an embodiment, the server 500 may include a cloud-based server that may serve to store and transmit information (for example, messages to be stored on a blockchain, footage from trips, and the like). Some or all of the individual components may be optional and/or different in various embodiments. In some embodiments, at least one of the servers described FIG. 5 may be located at or in communication with an AV.

The server 500 may be in communication with an AV 540, and one or more user devices 550. While FIG. 5 shows an AV 550, the diagram can also be applicable to a conventional vehicle (e.g., a vehicle used for ridesharing purposes). The AV 540 may be in communication with the one or more user devices 550. Further, the server 500, the AV 540, and/or the user devices 550 may be configured to communicate via one or more networks 542. The AV 540 may additionally be in wireless communication over one or more network(s) 542 with the user devices 550 via a connection protocol such as Bluetooth or NFC. Such network(s) 542 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 500 may include one or more processors 502, one or more memory devices 504 (also referred to herein as memory 504), one or more input/output (I/O) interface(s) 506, one or more network interface(s) 508, one or more sensor(s) or sensor interface(s) 510, one or more transceiver(s) 512, one or more optional display components 514, one or more optional speakers(s)/camera(s)/microphone(s) 516, and data storage 520. The server 500 may further include one or more bus(es) 518 that functionally couple various components of the server 500. The server 500 may further include one or more antenna(e) 530 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 518 may include at least one of a system bus, a memory bus, an address bus, or a message bus, and may permit the exchange of information (for example, data (including computer-executable code), signaling, etc.) between various components of the server 500. The bus(es) 518 may include, without limitation, a memory bus or a memory controller, a peripheral bus, an accelerated graphics port, and so forth. The bus(es) 518 may be associated with any suitable bus architecture.

The memory 504 of the server 500 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 520 may include removable storage and/or non-removable storage including, but not limited to, magnetic storage, optical disk storage, and/or tape storage. The data storage 520 may provide non-volatile storage of computer-executable instructions and other data.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to the memory 504 for use by the processor(s) 502 during the execution of the computer-executable instructions. More specifically, the data storage 520 may store one or more operating systems (O/S) 522; one or more database management systems (DBMS) 524; and one or more program module(s), applications, engines, computer-executable code, scripts, or the like. Some or all of these component(s) may be sub-component(s). Any of the components depicted as being stored in the data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 520 may support functionality described in reference to corresponding components named earlier in this disclosure.

The processor(s) 502 may be configured to access the memory 504 and execute the computer-executable instructions loaded therein. For example, the processor(s) 502 may be configured to execute the computer-executable instructions of the various program module(s), applications, engines, or the like of the server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit.

Referring now to other illustrative components depicted as being stored in the data storage 520, the O/S 522 may be loaded from the data storage 520 into the memory 504 and may provide an interface between other application software executing on the server 500 and the hardware resources of the server 500.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (for example, relational model, object model, etc.) and may support any of a variety of query languages.

Referring now to other illustrative components of the server 500, the input/output (I/O) interface(s) 506 may facilitate the receipt of input information by the server 500 from one or more I/O devices as well as the output of information from the server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 506 may also include a connection to one or more of the antenna(e) 530 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 500 may further include one or more network interface(s) 508 via which the server 500 may communicate with any of a variety of other systems, platforms, networks, devices, and so forth. The network interface(s) 508 may enable communication, for example, with one or more wireless routers, one or more host servers, one or more web servers, and the like via one or more networks.

The sensor(s)/sensor interface(s) 510 may include or may be capable of interfacing with any suitable type of sensing device such as, for example, inertial sensors, force sensors, thermal sensors, photocells, and so forth.

The display component(s) 514 may include one or more display layers, such as LED or LCD layers, touch screen layers, protective layers, and/or other layers. The optional camera(s) of the speakers(s)/camera(s)/microphone(s) 516 may be any device configured to capture ambient light or images. The optional microphone(s) of the speakers(s)/camera(s)/microphone(s) 516 may be any device configured to receive analog sound input or voice data. The microphone(s) of the speakers(s)/camera(s)/microphone(s) 516 may include microphones used to capture sound.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

It should further be appreciated that the server 500 may include alternate and/or additional hardware, software, or firmware components beyond those described or depicted without departing from the scope of the disclosure.

The user device 550 may include one or more computer processor(s) 552, one or more memory devices 554, and one or more applications, such as a vehicle application 556. Other embodiments may include different components.

The processor(s) 552 may be configured to access the memory 554 and execute the computer-executable instructions loaded therein. For example, the processor(s) 552 may be configured to execute the computer-executable instructions of the various program module(s), applications, engines, or the like of the device to cause or facilitate various operations to be performed in accordance with one or more embodiments of the disclosure. The processor(s) 552 may include any suitable processing unit capable of accepting data as input, processing the input data in accordance with stored computer-executable instructions, and generating output data. The processor(s) 552 may include any type of suitable processing unit.

The memory 554 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 550, the AV application 556 may be a mobile application executable by the processor 552 that can be used to present options and/or receive user inputs of information related to the disclosed embodiments. In addition, the user device 550 may communicate with the AV 540 via the network 542 and/or a direct connect, which may be a wireless or wired connection. The user device 550 may include a camera, scanner, bio reader or the like to capture biometric data of a user, perform certain processing step on the biometric date, such as extracting features from captured biometric data, and then communicating those extracted features to one or more remote servers, such as one or more of cloud-based servers.

The autonomous vehicle 540 may include one or more computer processor(s) 560, one or more memory devices 562, one or more sensors 564, and one or more applications, such as an autonomous driving application 566. Other embodiments may include different components. The autonomous vehicle 540 may additionally be in wireless communication 546 with the user device 550 via a connection protocol such as Bluetooth or Near Field Communication.

The processor(s) 560 may be configured to access the memory 562 and execute the computer-executable instructions loaded therein. For example, the processor(s) 560 may be configured to execute the computer-executable instructions of the various program module(s), applications, engines, or the like of the device to cause or facilitate various operations to be performed in accordance with one or more embodiments of the disclosure. The processor(s) 560 may include any suitable processing unit capable of accepting data as input, processing the input data in accordance with stored computer-executable instructions, and generating output data. The processor(s) 560 may include any type of suitable processing unit.

The memory 562 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module.

It should further be appreciated that the server 500 may include alternate and/or additional hardware, software, or firmware components beyond those described or depicted without departing from the scope of the disclosure.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
   at least one memory that stores computer-executable instructions; and
   at least one processor configured to access the at least one memory, wherein the at least one processor is configured to execute the computer-executable instructions to:
   determine a first state associated with a user of a ridesharing vehicle using a first type of device, wherein the first state comprises the user entering or exiting the ridesharing vehicle;
   identify a first confirmation of the first state using a second type of device, wherein the second type of device is building surveillance device that is separate from the ridesharing vehicle and is a different type of device than the first type of device;
   identify a second confirmation of the first state using a third type of device, wherein the third type of device is a different type of device than the first type of device and the second type of device;
   determine that a diversity threshold has been satisfied, wherein the diversity threshold comprises at least three different types of devices confirming the first state;
   add, based on the determination that the diversity threshold is satisfied, a first transaction to a blockchain, the first transaction comprising a first description of the first state, the first confirmation, and a link to a trip footage of the first state;
   determine a second state associated with the user;
   identify a third confirmation of the second state by the first type of device, the second type of device, the third type of device, or a fourth type of device;
   add a second transaction to the blockchain, the second transaction comprising a second description of the second state and the second confirmation;
   identify that a threshold number of devices generate respective hash values associated with the blockchain;
   identify that an entity device generates a hash value that does not match the respective hash values; and
   transmit a message to the entity device indicative of an occurrence of a hacking event associated with the blockchain.

2. The system of claim 1, wherein the third type of device comprises an infrastructural element device.

3. The system of claim 1, wherein the second state comprises a safety state of the user.

4. The system of claim 3, further comprising computer-executable instructions to:
   cause to present, prior to the user entering the ridesharing vehicle, an indication of one or more possible gestures;
   receive, by a camera, a signaling gesture made by the user;
   determine, based on receiving the signaling gesture and based on a determination that the signaling gesture is included in the one or more possible gestures, an indication that the user has identified a threatening condition; and
   notify an entity about the indication that the user has identified a threatening condition .

5. The system of claim 1, further comprising computer-executable instructions to:
   determine that the second state is indicative of an emergency condition associated with the user or the ridesharing vehicle; and
   notify an entity about an occurrence of the emergency condition.

6. The system of claim 1, wherein the first transaction further comprises a ridesharing status information comprising at least one of: an indication that the ridesharing vehicle is travelling to a destination, an indication that the ridesharing vehicle is picking up the user from a pickup location, or an indication that the ridesharing vehicle is dropping off the user at a drop-off location.

7. The system of claim 1, wherein the first transaction further comprises a location of the ridesharing vehicle and a timestamp of the ridesharing vehicle at the location.

8. The system of claim 1, wherein the computer-executable instruction to identify the first confirmation of the first state comprise computer-executable instruction to:
   identify that more than one of the devices each generate a corresponding hash value associated with the blockchain;
   determine that the each corresponding hash value does not match a predetermined hash value; and
   transmit an error message.

9. A method, comprising:
   determining a state associated with a user of a ridesharing vehicle from at least one first type of device associated with the ridesharing vehicle, wherein the state comprises the user entering or exiting the ridesharing vehicle;
   identifying a confirmation of the state by a second type of device, wherein the second type of device is a different type of device than the first type of device;
   identifying a second confirmation of the state using a third type of device, wherein the third type of device is a different type of device than the first type of device and the second type of device;
   determining that a diversity threshold has been satisfied, wherein the diversity threshold comprises at least three different types of devices confirming the state;
   adding, based on the determination that the diversity threshold is satisfied, a transaction to a blockchain, the transaction comprising a description of the state, the confirmation, and a link to a trip footage of the state, wherein the trip footage of the state includes footage of the user;
   identifying that a threshold number of devices generate respective hash values associated with the blockchain;
   identifying that an entity device generates a hash value that does not match the respective hash values; and
   transmitting a message to the entity device indicative of an occurrence of a hacking event associated with the blockchain.

10. The method of claim 9, wherein the second type of device comprises an infrastructural element device, another user's device, or another vehicle's device in proximity to the ridesharing vehicle.

11. The method of claim 9, wherein the state comprises a safety state of the user, and the method further comprises:
    receiving an indication, via a signaling gesture of the user, that the safety state of the user comprises an emergency condition; and
    notifying an entity about an occurrence of the emergency condition.

12. The method of claim 9, further comprising computer-executable instructions to:
    determine that the state is indicative of an emergency condition associated with the user or the ridesharing vehicle; and notify an entity about an occurrence of the emergency condition.

13. The method of claim 9, wherein the transaction further comprises a ridesharing status information comprising an indication that the ridesharing vehicle is travelling to a destination, wherein the ridesharing status information comprises a passenger count that is determined based on a user seatbelt being buckled.

14. The method of claim 9, wherein the transaction further comprises a ridesharing vehicle's location and a timestamp of the ridesharing vehicle at the location.

15. The method of claim 9, wherein the method further comprises:
    identify that more than one of the second type of device generate a corresponding hash value associated with the blockchain;
    determine that the each corresponding hash value does not match a predetermined hash value; and
    transmit an error message.

16. A non-transitory computer-readable medium storing computer-executable instructions which, when executed by a processor, cause the processor to perform operations comprising:
    determining a state associated with a user of a ridesharing vehicle from a first type of device associated with the ridesharing vehicle, wherein the state comprises the user entering or exiting the ridesharing vehicle;
    identifying a confirmation of the state by a second type of device, wherein the second type of device is a different type of device than the first type of device;
    identifying a second confirmation of the state using a third type of device;
    determining that a diversity threshold has been satisfied, wherein the diversity threshold comprises at least three different types of devices confirming the state;
    adding, based on the determination that the diversity threshold is satisfied, a transaction to a blockchain, the transaction comprising a description of the state, the confirmation, and a link to a trip footage of the state, wherein access to the trip footage is limited to a first type of user;
    identifying that a threshold number of devices generate respective hash values associated with the blockchain;
    identifying that an entity device generates a hash value that does not match the respective hash values;
    transmitting a message to the entity device indicative of an occurrence of a hacking event associated with the blockchain; and
    causing, based on identifying that the entity device generates a hash value that does not match the respective hash values, the ridesharing vehicle to be disconnected from external networks.

17. The non-transitory computer-readable medium of claim 16, wherein the first type of device comprises an infrastructural element device, another user's device, or another vehicle's device in proximity to the ridesharing vehicle.

18. The non-transitory computer-readable medium of claim 16, wherein the state comprises a safety state of the user, and the non-transitory computer-readable medium further comprises computer-executable instructions to:
    receive, by the device, an indication via a signaling gesture of the user, that the safety state of the user comprises an emergency condition; and
    notify an entity about an occurrence of the emergency condition.

19. The non-transitory computer-readable medium of claim 16, further comprising computer-executable instructions to:
    determine that the state is indicative of an emergency condition associated with the user or the ridesharing vehicle; and
    notify an entity about an occurrence of the emergency condition.

20. The non-transitory computer-readable medium of claim 16, wherein the transaction further comprises a ridesharing status information comprising at least one of: an indication that the ridesharing vehicle is travelling to a destination, an indication that the ridesharing vehicle is picking up the user from a pickup location, or an indication that the ridesharing vehicle is dropping off the user at a drop-off location, and wherein the ridesharing status information is determined based on a surveillance system external to the ridesharing vehicle.

* * * * *